(12) United States Patent
Mahoney et al.

(10) Patent No.: US 6,751,942 B2
(45) Date of Patent: Jun. 22, 2004

(54) SYSTEM FOR CONTROLLING FUEL FLOW TO GAS TURBINE ENGINE

(75) Inventors: Timothy D. Mahoney, Chandler, AZ (US); David D. Jones, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/441,770

(22) Filed: May 20, 2003

(65) Prior Publication Data

US 2003/0192300 A1 Oct. 16, 2003

Related U.S. Application Data

(62) Division of application No. 09/949,097, filed on Sep. 7, 2001, now Pat. No. 6,655,151.

(51) Int. Cl.$^7$ ............................................. F02C 9/28
(52) U.S. Cl. ................................. 60/39.281; 60/734
(58) Field of Search ........................ 60/39.281, 734

(56) References Cited

U.S. PATENT DOCUMENTS

| | | | |
|---|---|---|---|
| 3,488,946 A | 1/1970 | Jubb et al. | |
| 4,493,187 A | 1/1985 | Hansen | |
| 4,578,945 A | 4/1986 | Peck et al. | |
| 4,602,479 A | 7/1986 | Hansen | |
| 4,817,376 A | 4/1989 | Brocard et al. | |
| 4,835,969 A | 6/1989 | Tallman | |
| 4,837,697 A | 6/1989 | Eisa et al. | |
| 4,984,424 A | 1/1991 | Shekleton | |
| 5,209,058 A | * 5/1993 | Sparks et al. | 60/39.281 |
| 5,235,806 A | 8/1993 | Pickard | |
| 5,490,379 A | 2/1996 | Wernberg et al. | |
| 5,528,897 A | 6/1996 | Halin | |
| 5,709,079 A | 1/1998 | Smith | |
| 5,722,373 A | 3/1998 | Paul et al. | |
| 5,896,737 A | * 4/1999 | Dyer | 60/39.281 |
| 5,899,064 A | 5/1999 | Cheung | |
| 6,176,076 B1 | 1/2001 | Ford | |
| 6,272,843 B1 | 8/2001 | Schwamm | |

FOREIGN PATENT DOCUMENTS

| | | |
|---|---|---|
| EP | 0 890 722 A2 | 1/1999 |
| EP | 0 953 749 A2 | 11/1999 |
| EP | 1 146 214 A2 | 10/2001 |
| EP | 1 205 654 A | 5/2002 |
| FR | 2 733 277 | 10/1996 |
| GB | 1 492 384 | 11/1977 |
| WO | WO 00/23700 * | 4/2000 |
| WO | WO 02/31332 A1 | 4/2002 |
| WO | PCT/US02/28420 | 12/2002 |

* cited by examiner

Primary Examiner—Louis J. Casaregola
(74) Attorney, Agent, or Firm—Douglas A. Mullen, Esq.

(57) ABSTRACT

A system for controlling the flow of fuel to a gas turbine engine is operable in at least two modes. In a first mode, the flow rate of fuel supplied from a fuel source to the combustors of the turbine engine is controlled by modulating the position of a metering valve. A controller determines the controllability of the metering valve and, if it is determined to be non-controllable, then the system is operated in the second mode. In the second mode, the flow rate of fuel supplied to the combustors is controlled by modulating the position of a bypass valve.

12 Claims, 2 Drawing Sheets

SYSTEM FOR CONTROLLING FUEL FLOW TO GAS TURBINE ENGINE

RELATED APPLICATIONS

This is a divisional of and claims priority from application Ser. No. 09/949,097 entitled "System and Method for Controlling Fuel Flow To A Gas Turbine Engine", filed Sep. 7, 2001 (U.S. Pat. No. 6,655,151), which is incorporated herein by reference.

BACKGROUND OF THE INVENTION

The present invention relates to a fuel supply and control system for gas turbine engines and, more particularly, to a system and method for controlling the flow of fuel to a gas turbine engine even under various postulated fuel supply and control system faults.

Typical gas turbine engine fuel supply systems include a fuel source, such as a fuel tank, and one or more pumps that take a suction on the tank and deliver pressurized fuel to the fuel manifolds in the engine combustor via a main supply line. The main supply line may include one or more valves in flow series between the pumps and the fuel manifolds. These valves generally include at least a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

A redundant channel engine control system controls the operation of the engine and the fuel supply system. In particular, each of the redundant channels in the engine control system receives input parameters from the engine and aircraft and a thrust setting from the pilot. In response to these inputs, the engine control system modulates the position of the main metering valve to control the fuel flow rate to the engine fuel manifolds to maintain the desired thrust.

Fuel supply and control systems, such as the one described above, may experience certain postulated failure modes. For example, a postulated failure in the engine control system or in the fuel supply system may cause significantly higher fuel flow than commanded to one of the engines. This higher fuel flow can cause an asymmetric overthrust condition, which in some instances may lead to an overspeed shutdown of the engine. Failures that may lead to an asymmetric overthrust condition include a failure in the engine control system that causes the main metering valve to become fully-opened or to stick in a fully-opened or intermediate position, or the main metering valve may itself fail in a fully-opened or intermediate position. A sustained asymmetric overthrust condition while the aircraft is on the ground can, in some systems, cause the aircraft to exit the runway. A sustained asymmetric overthrust condition while the aircraft is in the air and on final approach to the runway can, in other systems, cause an in-flight shutdown of the engine.

Presently, fuel control systems like that described above may accommodate the postulated asymmetric overthrust conditions by including a mechanical overspeed governor (OSG), an automatic shut-off (or significant reduction) of fuel flow via an electric overspeed shutdown (OSSD), or both. Each of these features, however, presents it own disadvantages for the postulated asymmetric overthrust condition. For example, a mechanical OSG can only control fuel flow to a single, fixed, maximum setpoint. Thus, operation on a mechanical OSG alone may still lead to a sustained overthrust condition. With an electric OSSD, the pilot may not be able to control the aircraft if the postulated overthrust condition occurs. In particular, if the asymmetric overthrust condition occurred during approach to the runway, the excursion could result in the engine going from a low thrust condition, to an overthrust condition, and then to a shutdown condition.

Hence, there is a need for a system and method for controlling the supply of fuel to a gas turbine engine even under various postulated fuel supply and control system faults that overcomes one or more of the above-noted drawbacks. Namely, a fuel control system and method that, in the event of a failure that leads to an asymmetric overthrust condition, allows fuel flow control beyond a single, fixed, maximum setpoint, and/or does not result in a potentially uncontrollable engine excursion.

SUMMARY OF THE INVENTION

The present invention provides a system and method for controlling the supply of fuel to a gas turbine engine even under various system and/or component faults that may cause an asymmetric overthrust condition of the engine.

In one aspect of the present invention, and by way of example, a method of controlling fuel flow to a gas turbine engine combustor includes supplying fuel from the fuel source to a supply line. A first fraction of the fuel from the supply line is directed through a metering valve having a first variable area flow orifice to the combustor. A second fraction of the fuel from the supply line is directed through a bypass valve having a second variable area flow orifice to the fuel source. A determination is made as to whether the metering valve is controllable or non-controllable. Fuel flow to the combustor is controlled by (i) adjusting the areas of both the first and second variable area flow orifices when the metering valve is determined to be controllable and (ii) adjusting the area of only the second variable area flow orifice when the metering valve is determined to be non-controllable.

In another exemplary aspect of the invention, a system for delivering fuel from a fuel source to a gas turbine engine combustor includes a fuel supply line, a metering valve, a bypass flow line, a bypass valve, and a controller. The fuel supply line is coupled between the fuel source and the combustor for supplying fuel to the combustor. The metering valve is positioned in flow-series in the supply line. The bypass flow line is coupled between an inlet of the metering valve and the fuel source for bypassing a portion of the fuel in the fuel supply line back to the fuel source. The bypass valve is positioned in flow-series in the bypass flow line. The controller is operable to selectively adjust one of the metering valve and the bypass valve to control fuel flow rate from the fuel source to the combustor.

In yet another exemplary aspect of the invention, a controller for controlling the flow rate of fuel from a pressurized fuel source to a gas turbine engine combustor via a metering valve, includes a first valve driver circuit, a second valve driver circuit, and a processor. The first valve driver circuit is operable to generate a first valve driver signal, and the second valve driver circuit is operable to generate a second valve driver signal. The processor is operable to determine the controllability of the metering valve and, based on the determination, enable one of the first and the second valve driver circuits and disable the other.

Other independent features and advantages of the preferred sensor will become apparent from the following detailed description, taken in conjunction with the accompanying drawings which illustrate, by way of example, the principles of the invention.

DETAILED DESCRIPTION OF VARIOUS EMBODIMENTS

Figure 1:
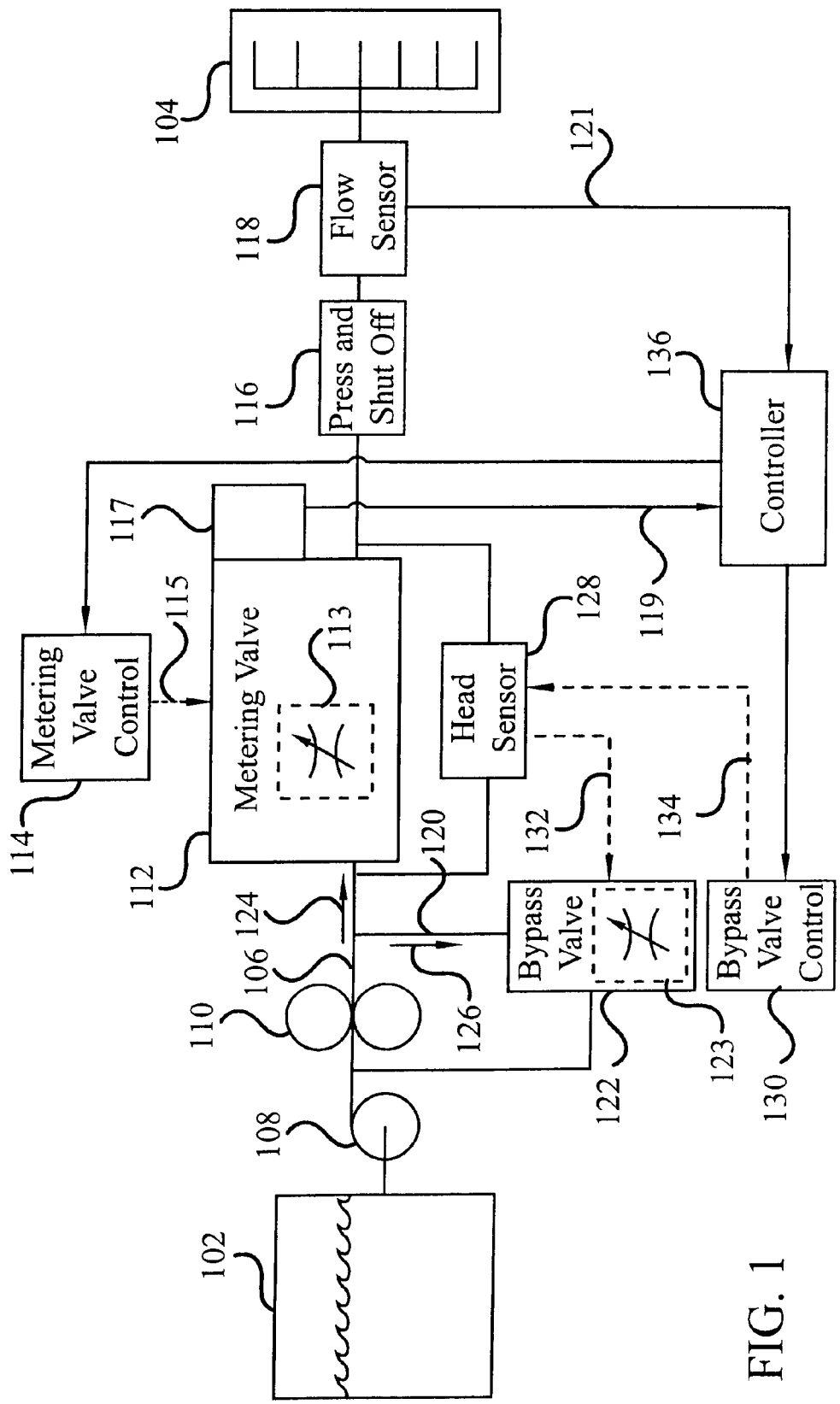
FIG. 1 is a block diagram of fuel delivery and control system for a gas turbine engine according to an exemplary embodiment of the present invention.

A fuel delivery and control system for a gas turbine engine, such as a turbofan jet aircraft engine, according to one embodiment the present invention, is depicted in FIG. 1. The system 100 includes a fuel source 102, such as a tank, that stores the fuel supplied to a jet engine combustor 104. A supply line 106 is coupled to the fuel source 102 and, via various components, delivers the fuel to the combustor 104. It is noted that the supply line 106 is, for convenience, depicted and described with a single reference numeral. However, it will be appreciated that the system is implemented using separate sections of piping, though a single section is certainly not prohibited.

One or more pumps are positioned in flow-series in the supply line 106 and take a suction on the fuel source 102. In the depicted embodiment, a booster pump 108, such as a relatively low horsepower centrifugal pump, and a high pressure pump 110, such as a positive displacement pump, are used. The booster pump 108 takes a suction directly on the fuel source 102 and provides sufficient suction head for the high pressure pump 110. The high pressure pump 110 then supplies the fuel, at a relatively high pressure, such as up to 1200 psig, to the remainder of the supply line 106.

A metering valve 112 is positioned in flow-series in the supply line 104 downstream of the high pressure pump 110. The metering valve 112 includes a first variable area flow orifice 113 through which a portion of the fuel in the supply line 106 flows. A metering valve control device 114 is used to adjust the position of the metering valve 112, and thus the area of the first variable area flow orifice. In the depicted embodiment, the metering valve 112 is a hydraulically-operated valve and the metering valve control device 114 is an electro-hydraulic servo valve (EHSV) that supplies a metering valve control signal output 113. The control signal output 115 from the metering valve control device 114 is coupled to the metering valve 112 and is used to adjust the position of the metering valve 112 by controlling the flow of operational hydraulic fluid to the metering valve 112. It is to be appreciated that the metering valve 112 and its control device 114 just described are only exemplary of a particular preferred embodiment, and that each may be implemented using other types of components. For example, the metering valve 112 could be an electrically operated valve. In this case, it may not utilize a control device 114 such as an EHSV, or the control device 114 could be implemented as an independent controller. In any case, as will be described further below, fuel flow rate to the combustor 104 is, under normal circumstances, controlled by adjusting the position of the metering valve 112, and thus the area of the first variable area flow orifice 113, via the metering valve control device 114.

A position sensor 117 is coupled to the metering valve 112, and is used to sense the metering valve's position and supply a valve position signal 119. The position of the metering valve 112 is directly related to the area of the first variable area flow orifice 113, which, as will be discussed further below, is directly related to the fuel flow rate to the combustor 104. The position sensor 117 is preferably a dual channel linear variable differential transformer (LVDT), but could be any one of numerous position sensing devices known in the art. For example, the position sensor 117 could be a rotary variable differential transformer (RVDT), an optical sensor, a float-type sensor, etc.

Two additional major components are positioned in flow-series in the supply line 106 between the metering valve 112 and the combustor 104. These two major components are a pressurizing and shutoff valve 116 and a flow sensor 118. The pressurizing-and-shutoff valve 116 functions to ensure a minimum system pressure magnitude is in the supply line 106 downstream of the metering valve 112, and shuts when the pressure falls below this minimum pressure magnitude. The flow sensor 118 measures the fuel flow rate to the combustor 104 and generates a flow signal 121 representative of the measured flow rate.

A bypass flow line 120 is connected to the supply line 106 between the high pressure pump 110 and the metering valve 112, and bypasses a portion of the fuel in the supply line 106 back to the inlet of the high pressure pump 110. It will be appreciated that the present invention is not limited to bypassing a portion of the fuel back to the inlet of the high pressure pump 110, but also includes embodiments in which the fuel is bypassed back to the inlet of the booster pump 108, or back to the fuel source 102.

A bypass valve 122 is positioned in flow-series in the bypass flow line 120, and includes a second variable area flow orifice 123 through which fuel in the bypass flow line 120 flows. Thus, as indicated by the flow arrows in FIG. 1, a first fraction 124 of the fuel in the supply line 106 is directed through the metering valve 112, and a second fraction 126 is directed through the bypass valve 122. As will be discussed further below the absolute (and relative) magnitudes of the first fraction 124 and second fraction 126 are controlled by adjusting the areas of the first 113 and the second 123 variable area flow orfices. Similar to the metering valve 112, the bypass valve 122 in the depicted embodiment is a hydraulically-operated valve. Again, it will be appreciated that a hydraulically-operated bypass valve 122 is only exemplary of a particular preferred embodiment, and that other types of valves may be used. For example, the bypass valve could be a pneumatically-operated valve or an electrically-operated valve.

The position of the bypass valve 122, and thus the area of the second variable area flow orifice 123, is adjusted under the control of one of two components. These components are a head sensor 128 and a bypass valve control device 130, each of which will now be discussed in turn. Before doing so, however, it should be understood that the head sensor 128 is normally used to adjust the bypass valve's position, whereas the bypass valve control device 130 is used when a system failure occurs that could result in an asymmetric overthrust condition.

Turning first to the head sensor 128, as FIG. 1 depicts, this component is positioned in flow-parallel with the metering valve 112. The head sensor 128 senses the differential pressure ( )P) between the inlet and outlet of the metering valve 112, and supplies a first bypass valve control signal output 132. The first bypass valve control signal output 132 from the head sensor 128 is coupled to the bypass valve 122 and is used to adjust the area of the second variable area flow orifice 123 by controlling the flow of operational hydraulic fluid to the bypass valve 122. In particular, the first bypass valve control signal output 132 from the head sensor 128 is used to adjust the area of the second variable area flow orifice 123 to maintain a substantially constant, predetermined )P across the metering valve 112. The reason for this will be discussed in more detail below. It will be appreciated that the head sensor 128 may be any one of numerous types of sensors known in the art. In a particular preferred embodiment, in which the bypass valve 122 is a hydraulically-operated valve, the head sensor 128 is a thermally-compensated, spring-loaded, hydraulically-operated sensor. It will be appreciated that the head sensor 128 may also be a diaphragm-type sensor, or any one of numerous known electrically-operated sensors. Its selection is dependent on the fuel system 100 arrangement and type of valve used for the bypass valve 122.

The bypass valve control device 130, in the depicted embodiment, is constructed similar to that of the metering valve control device 114. Specifically, the bypass valve control device 130 is an EHSV that supplies a second bypass valve control signal output 134. However, rather than supplying the second bypass valve control signal output 134 directly to the bypass valve 122, the bypass valve control device 130 supplies the second bypass valve control signal output 134 to the head sensor 128. The second bypass valve control signal output 134 causes the head sensor 128 not to sense the actual )P across the metering valve 112. Rather, the second bypass valve control signal output 134 causes the head sensor 128 to sense a false, predetermined )P across the metering valve 112, based on the second bypass valve control signal 134. The head sensor 128 then supplies an appropriate first bypass valve control signal 132 to the bypass valve 122 based on the predetermined )P, to thereby control the area of the second variable area flow orifice 123. As with the metering valve 112, if the bypass valve 122 is an electrically-operated valve, the bypass valve control device 130 could be eliminated, or it could be implemented as an independent controller. Nonetheless, as was alluded to above, and as will be described in more detail below, fuel flow rate to the combustor 102 can be controlled, if necessary, by adjusting the position of the bypass valve 122, and thus the area of the second flow orifice 123, via the bypass valve control device 130.

Figure 2:
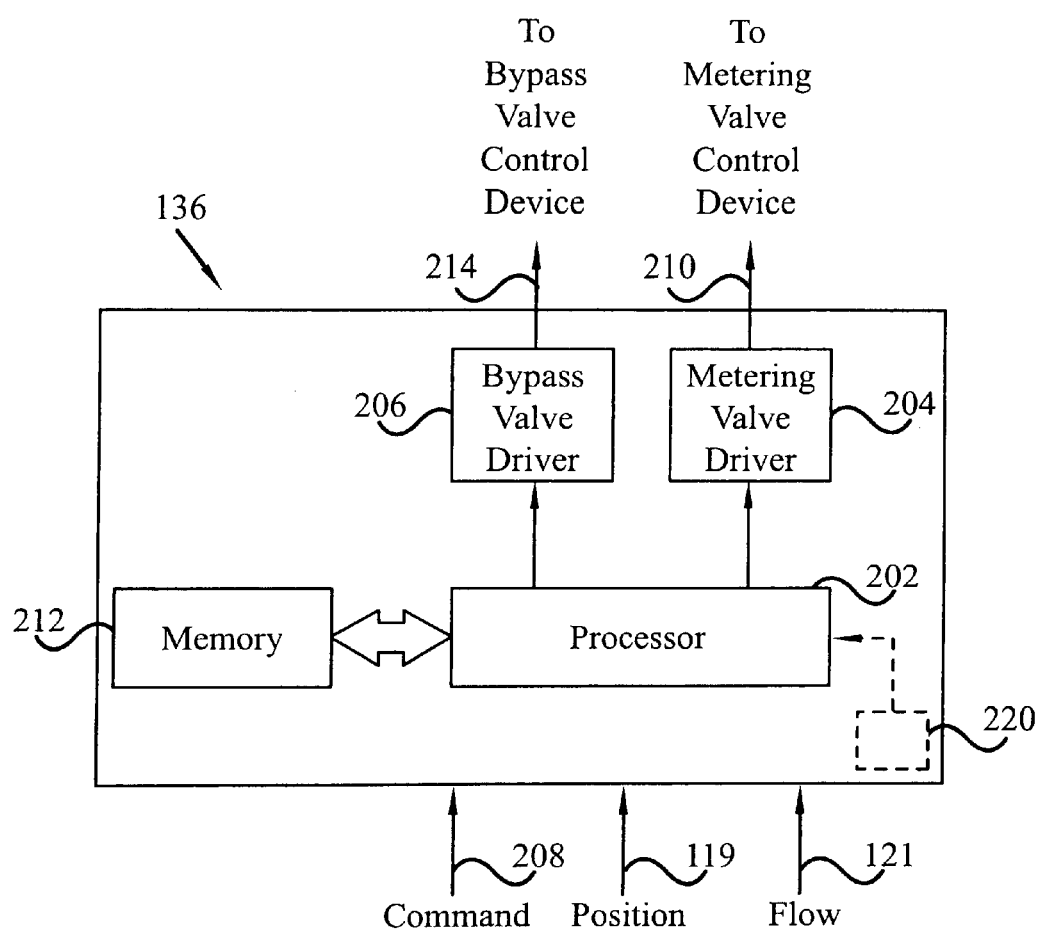
FIG. 2 is a block diagram of an exemplary controller used in the fuel delivery and control system depicted in FIG. 1.

An engine controller 136, such as a Full Authority Digital Engine Controller (FADEC), controls the overall operation of the aircraft's engines, including the flow of fuel to the combustors 104 in each engine. With respect to fuel supply to the combustors 104, the controller 136 receives various input signals and controls the fuel flow rate to the combustor 104 accordingly. The controller 136 further functions to determine the controllability of the metering valve 112. As was noted above, if the metering valve 112 is not controllable then an asymmetric overthrust condition can occur. A more detailed discussion of the controller 136 and its functions will now be provided. In doing so, reference should now be made to FIG. 2, which depicts a block diagram of the controller 136.

The controller 136 includes, among other components, a main processor 202, and two valve driver circuits—a first valve driver circuit 204 and a second valve driver circuit 206. Although the controller 136 is depicted and described herein as including only a single processor 202, it will be appreciated that this is done for convenience only and that the controller 136 may be implemented with a plurality of redundant processors 202. The main processor 202 receives an input control signal 208 from throttle control equipment (not illustrated) in the cockpit, the position signal 119 from the position sensor 117, and the flow signal 121 from the flow sensor 118. The processor 202, in response to one or more of these signals, adjusts the position of the metering valve 112, via the first valve driver 204, in a first control mode, or the position of the bypass valve 122, via the second valve driver 206, in a second control mode. The circumstances under which the controller 136 operates in the first and second control modes, will now be described.

Under normal operating circumstances, that is, when the metering valve 112, the metering valve control device 114, the position sensor 117, the first valve driver 204, the processor 202, and all interconnecting hardware are all operating properly, the controller 136 operates in the first mode, and the first driver circuit 204 is enabled. In the first mode, the processor 202 receives the input signal 208, the position signal 119, and the flow signal 121. The processor 202 processes each of the signals and outputs an appropriate signal to the first valve driver circuit 204. The first valve driver circuit 204, in response to the signal from the processor 202, supplies a first valve driver signal 210 to the metering valve control device 114. In response to the first valve driver signal 210, the metering valve control device 114, as was described above, adjusts the area of the first variable area flow orifice 113 to obtain the desired flow rate to the combustor 104. Specifically, the fuel flow rate ($W_f$) to the combustor 104 is controlled in accordance with the following flow equation:

$$W_f = CA()P)^{1/2},$$

where C is a flow constant, A is the area of the first variable area flow orifice 113, and )P is the differential pressure across the metering valve 112. The bypass valve 122, as was noted above, is normally adjusted to maintain a constant )P across the metering valve 112. Thus, since C is a constant, the flow rate, $W_f$, is controlled by adjusting the area, A, of the first variable area flow orifice 113.

The processor 202 in the controller 136 also uses the above-mentioned input signals 119, 121, 208 to determine whether the system 100 includes a fault that could result in an asymmetric overthrust condition. In particular, the processor 202 determines whether or not the metering valve 112 is controllable. Any number of failures could cause the metering valve 112 to be non-controllable. For example, the first valve driver 204 could fail, one of the processors 202 could fail (if redundant processors 202 are used), the metering valve control device 114 could fail, the position sensor 117 could fail, the interconnecting signal hardware could fail, or the metering valve 112 itself could fail. Such failures could cause the metering valve 112 to stick in an intermediate or fully-open position, or cause the metering valve 112 to move uncontrollably to an intermediate or fully-open position, simply prevent stable, close-loop control of the metering valve 112. Hence, the processor 202 uses various methods to determine whether the metering valve 112 is controllable or non-controllable.

One of the methods the processor 202 uses to make to determine whether the metering valve 112 is controllable or not is by comparing the measured flow rate to the desired fuel flow rate. If this comparison indicates that the measured flow rate is substantially equal to the desired flow rate, then the metering valve 112 is determined to be controllable. Conversely, if the comparison indicates that these parameters are unequal, then the metering valve 112 is determined to be non-controllable. The measured flow rate for this comparison is preferably provided by the metering valve position signal 119, since it is directly related to flow rate through the metering valve 112. The desired fuel flow rate for this comparison is preferably provided, either directly or indirectly, by the input control signal 208. In other words, the input control signal 208 may be used directly by the comparison algorithm in the processor 202 or, alternatively, the input control signal 209 may be used as a pointer to a look-up table in a memory storage device 212, such as a read-only-memory (ROM) or a random-access-memory (RAM). It will be appreciated that the measured flow rate for the comparison could be also be provided by the flow signal 121 supplied from the flow sensor 118. Another method of determining whether the metering valve 112 is controllable or not is to conduct real-time, in-situ electrical tests of the position sensor 117 wiring and the metering valve control device 114 wiring. Yet another method includes comparing the metering valve position signal 119 with the flow signal 121 supplied from the flow sensor 118. It will be appreciated that any of these tests may be used independently or in combination. In a preferred embodiment, the processor 202 performs all of the tests.

If, based on one or more of the above-described tests, the processor 202 determines that the metering valve 112 is non-controllable, then the controller 136 operates in the second mode. When operating in the second mode, the second valve driver 206 is enabled, and the controller 136 appropriately adjusts the bypass valve 122 in accordance with the input control signal 208. Specifically, processor 202 processes the input control signal 208 and outputs an appropriate signal to the second valve driver circuit 206. The second valve driver circuit 206, in response to the signal from the processor 202, supplies a second valve driver signal 214 to the bypass valve control device 130. In response to the second valve driver signal 214, the bypass valve control device 130, as was described above, adjusts the area of the second variable area flow orifice 123 to obtain the desired flow rate to the combustor 104. In the second control mode, the area of the second variable area flow orifice 123 is increased in order to decrease fuel flow to the combustor 104, and is decreased in order to increase fuel flow.

When the controller 136 is operating in the second control mode, the control scheme used to adjust the area of the second variable area orifice 123 differs from the scheme used to adjust the area of the first variable area orifice 113. The reasons for this are that a constant )P is not maintained across the bypass valve 122 and a position sensor is not provided to sense bypass valve position. It should be understood that the present invention encompasses an embodiment that includes these additional components to provide this functionality. However, these components are not provided in the depicted embodiment since they would only be needed for the postulated system faults and, therefore, do not justify the additional costs and system complexity.

Thus, the control scheme used to adjust the bypass valve 122 is based on fuel flow (e.g., inner loop control) or engine speed (e.g., outer loop control). The inner loop control scheme uses the measured flow rate from the flow sensor 118 along with various other sensed parameters to adjust the area of the second variable area flow orifice 123. The outer loop control scheme uses measured engine speed along with various other sensed parameters to adjust the area of the second variable area flow orifice 123. The detailed algorithms used to implement the inner and outer loop control schemes may be any one of numerous known control schemes. One particular exemplary inner loop control scheme is described in U.S. patent application Ser. No. 09/625,700, entitled "Simplified Fuel System for Jet Engines" by Robert S. McCarty et al., which is assigned to the assignee of the present application, and the entirety of which is hereby incorporated by reference.

It will be further appreciated that the present invention encompasses an embodiment that does not utilize an automated feedback control scheme to control the position of the bypass valve 122. In this alternative embodiment, the pilot monitors either an indication of engine speed or fuel flow (or both) and adjusts a manual input 220 (shown in phantom in FIG. 2) to control the area of the second variable area flow orifice 123 to obtain the desired indicated engine speed and/or fuel flow. Moreover, although the circuitry used to control the position of the bypass valve 122 in the second control mode is depicted and described as being integral with the controller 136, it is to be appreciated that the present invention is not limited to this configuration. Indeed, this circuitry could be implemented physically separate from the controller 136.

The system and method described allows for the delivery and control of fuel to a gas turbine engine even under various postulated faults. In the event of a system failure that could lead to an asymmetric overthrust condition, the control system, and the method it implements, allows for the controlled delivery of fuel beyond just a single, fixed, maximum setpoint. In addition, the system and method substantially reduce the likelihood that such a failure will result in a potentially uncontrollable engine excursion.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

We claim:

1. A system for delivering fuel from a fuel source to a gas turbine engine combustor, comprising:

a fuel supply line having an inlet coupled to the fuel source and an outlet coupled to the combustor; a metering valve positioned in flow-series in the supply line;

a bypass flow line coupled between an inlet of the metering valve and the fuel supply line inlet for bypassing a portion of the fuel in the supply line back to the inlet;

a bypass valve positioned in flow-series in the bypass flow line; and a controller operable to determine whether the metering valve is controllable or non-controllable and configured, in response thereto, to (i) adjust the metering valve to control fuel flow to the combustor when the metering valve is determined to be controllable and (ii) adjust the bypass valve to-control fuel flow to the combustor when the metering valve is determined to be non-controllable.

2. The system of claim 1, wherein:

the metering valve includes a variable area flow orifice; and the controller, when operable to adjust the metering valve, supplies a valve control signal to adjust the area of the variable area flow orifice.

3. The system of claim 2, further comprising:

a metering valve control device coupled to the metering valve and to receive the valve control signal, the metering valve control device operable, in response to the valve control signal, to adjust the metering valve.

4. The system of claim 1, wherein:

the bypass valve includes a variable area flow orifice; and the controller, when operable to adjust the bypass valve, supplies a valve control signal to adjust the area of the variable area flow orifice.

5. The system of claim 4, further comprising:

a head sensor operably coupled between an inlet and an outlet of the metering valve for (i) sensing a differential pressure between the inlet and the outlet and (ii) adjusting the bypass valve to maintain a substantially constant predetermined differential pressure there between.

6. The system of claim 5, further comprising:

a bypass valve control device coupled to the head sensor and to receive the valve control signal, the bypass valve control device operable, in response to the valve control signal, to cause the head sensor to sense a predetermined differential pressure to thereby adjust the bypass valve.

7. The system of claim 6, wherein the bypass valve control device is not operable to cause the head sensor to sense a predetermined differential pressure when the controller is operable to adjust the metering valve.

8. The system of claim 1, further comprising:

a position sensor operably coupled to the metering valve for sensing a position of the metering valve and supplying a metering valve position signal to the controller, wherein the controller determines whether the metering valve is controllable or non-controllable by comparing the valve position signal and a commanded flow signal.

9. The system of claim 8, further comprising:

a flow sensor operably coupled to the fuel supply line for sensing flow rate of the fuel to the combustor and supplying a flaw signal to the controller, wherein the controller determines whether the metering valve is controllable or non-controllable by comparing the position signal and the flow signal.

10. The system of claim 1, further comprising: a flow sensor operably coupled to the fuel supply line for sensing flow rate of the fuel to the combustor and supplying a flow signal to the controller, wherein the controller determines whether the metering valve is controllable or non-controllable by comparing the flow signal and a commanded flow signal.

11. The system of claim 8, wherein the controller is operable to perform electrical checks of the position sensor and interconnecting wiring.

12. The system of claim 10, wherein the controller is operable to perform electrical cheeks of the flow sensor and interconnecting wiring.

* * * * *